(12) United States Patent
Goel et al.

(10) Patent No.: US 10,337,755 B2
(45) Date of Patent: Jul. 2, 2019

(54) METHOD AND APPARATUS FOR REHEAT DEHUMIDIFICATION WITH VARIABLE AIR VOLUME

(71) Applicant: Lennox Industries LLC, Richardson, TX (US)

(72) Inventors: Rakesh Goel, Carrollton, TX (US); Derek Phillips, Carrollton, TX (US)

(73) Assignee: Lennox Industries LLC, Richardson, TX (US)

( * ) Notice: Subject to any disclaimer, the term of this patent is extended or adjusted under 35 U.S.C. 154(b) by 67 days.

(21) Appl. No.: 14/954,531

(22) Filed: Nov. 30, 2015

(65) Prior Publication Data
US 2017/0153037 A1    Jun. 1, 2017

(51) Int. Cl.
| | |
|---|---|
| F24F 3/14 | (2006.01) |
| F24F 11/77 | (2018.01) |
| F25B 39/02 | (2006.01) |
| F24F 11/30 | (2018.01) |
| F24F 110/10 | (2018.01) |
| F24F 110/20 | (2018.01) |

(Continued)

(52) U.S. Cl.
CPC ............ *F24F 11/77* (2018.01); *F24F 3/1405* (2013.01); *F25B 39/028* (2013.01); *F24F 11/30* (2018.01); *F24F 11/83* (2018.01); *F24F 2110/10* (2018.01); *F24F 2110/20* (2018.01); *F24F 2140/20* (2018.01); *F24F 2221/16* (2013.01)

(58) Field of Classification Search
CPC ............... F24F 11/0079; F24F 11/0015; F24F 11/0012; F24F 2011/0057; F24F 2011/0045; F24F 2011/0091; F24F 3/1405; F24F 2221/16; F24F 2110/00; F24F 2110/20; F24F 2130/10; F24F 2140/50; F24F 11/77; F25B 39/028
USPC ...................................................... 62/93, 115
See application file for complete search history.

(56) References Cited

U.S. PATENT DOCUMENTS

| | | | |
|---|---|---|---|
| 4,408,713 | A | 10/1983 | Iijima et al. |
| 4,744,223 | A | 5/1988 | Umezu |

(Continued)

FOREIGN PATENT DOCUMENTS

| | | |
|---|---|---|
| AU | 2011100169 A4 | 3/2011 |
| CA | 2775540 A1 | 11/2012 |

(Continued)

OTHER PUBLICATIONS

U.S. Appl. No. 15/177,639, Goel.

(Continued)

*Primary Examiner* — Joseph F Trpisovsky
(74) *Attorney, Agent, or Firm* — Winstead PC

(57) ABSTRACT

The HVAC system includes an evaporator coil and a metering device fluidly coupled to the evaporator coil via a distribution line. The HVAC system includes a variable-speed circulation fan for circulating air around the evaporator coil. A temperature sensor is thermally exposed to the distribution line. At least one controller is operatively coupled to the temperature sensor and to the variable-speed circulation fan. The at least one controller adjusts a speed of the variable-speed circulation fan to increase latent capacity of the HVAC system responsive to a determination that a temperature of fluid in the distribution line exceeds an optimal distribution line temperature.

19 Claims, 6 Drawing Sheets

(51) Int. Cl.
*F24F 140/20* (2018.01)
*F24F 11/83* (2018.01)

(56) References Cited

U.S. PATENT DOCUMENTS

| | | | |
|---|---|---|---|
| 4,813,474 A | 3/1989 | Umezu | |
| 4,873,649 A | 10/1989 | Grald et al. | |
| 5,058,388 A | 10/1991 | Shaw et al. | |
| 5,062,276 A | 11/1991 | Dudley | |
| 5,095,715 A | 3/1992 | Dudley | |
| 5,481,166 A | 1/1996 | Moreira | |
| 5,832,744 A | 11/1998 | Dorste et al. | |
| 6,055,819 A | 5/2000 | Kang | |
| 6,070,110 A | 5/2000 | Shah et al. | |
| 6,427,454 B1 | 8/2002 | West | |
| 6,789,881 B2 | 9/2004 | Silverbrook | |
| 6,792,767 B1 | 9/2004 | Pargeter et al. | |
| 6,826,921 B1 | 12/2004 | Uselton | |
| 6,826,922 B2 | 12/2004 | Patel et al. | |
| 7,770,405 B1 | 8/2010 | Dillon | |
| 8,397,522 B2* | 3/2013 | Springer | F24F 3/153 62/176.6 |
| 8,689,582 B2 | 4/2014 | Birkelund et al. | |
| 8,948,918 B2 | 2/2015 | Chamorro et al. | |
| 2005/0056042 A1 | 3/2005 | Bourne et al. | |
| 2005/0241325 A1 | 11/2005 | Olney | |
| 2005/0278071 A1 | 12/2005 | Durham | |
| 2008/0098756 A1 | 5/2008 | Uselton | |
| 2008/0245083 A1 | 10/2008 | Tutunoglu et al. | |
| 2008/0307803 A1 | 12/2008 | Herzon | |
| 2009/0192650 A1 | 7/2009 | Tonner | |
| 2009/0205354 A1* | 8/2009 | Brown | F24F 3/1405 62/324.5 |
| 2009/0277193 A1 | 11/2009 | Springer et al. | |
| 2010/0082161 A1* | 4/2010 | Patch | F24F 11/0001 700/276 |
| 2010/0082162 A1 | 4/2010 | Mundy et al. | |
| 2010/0307733 A1 | 12/2010 | Karamanos et al. | |
| 2011/0083454 A1 | 4/2011 | Kopko et al. | |
| 2011/0208325 A1 | 8/2011 | Liu | |
| 2011/0301762 A1 | 12/2011 | Walker et al. | |
| 2012/0137713 A1 | 6/2012 | Duraisamy et al. | |
| 2012/0303165 A1 | 11/2012 | Qu et al. | |
| 2012/0318007 A1 | 12/2012 | Lukasse et al. | |
| 2013/0061619 A1 | 3/2013 | Saitou et al. | |
| 2013/0213064 A1 | 8/2013 | Gomes et al. | |
| 2013/0255297 A1 | 10/2013 | Matsuoka et al. | |
| 2014/0131009 A1 | 5/2014 | Zhou et al. | |
| 2014/0245762 A1 | 9/2014 | Schlesinger | |
| 2014/0345307 A1* | 11/2014 | Bagley | F25B 49/02 62/115 |
| 2014/0360211 A1 | 12/2014 | Hovel et al. | |
| 2015/0021005 A1 | 1/2015 | Land, III | |
| 2015/0075766 A1 | 3/2015 | Alston | |
| 2015/0233623 A1 | 8/2015 | Izadi-Zamanabadi et al. | |
| 2015/0323423 A1 | 11/2015 | Alsaleem | |
| 2015/0337831 A1 | 11/2015 | Zhou et al. | |
| 2016/0273815 A1 | 9/2016 | Downie et al. | |

FOREIGN PATENT DOCUMENTS

| | | |
|---|---|---|
| WO | WO-8912269 A1 | 12/1989 |
| WO | WO-97/32167 A1 | 9/1997 |

OTHER PUBLICATIONS

U.S. Appl. No. 15/177,585, Goel.
U.S. Appl. No. 14/706,535, Goel.
U.S. Appl. No. 14/954,558, Goel et al.
U.S. Appl. No. 15/044,243, Goel et al.
Research and Development Roadmap for Emerging HVAC Technologies—Goetzier et al. (Oct. 2014).

* cited by examiner

METHOD AND APPARATUS FOR REHEAT DEHUMIDIFICATION WITH VARIABLE AIR VOLUME

CROSS REFERENCE TO RELATED APPLICATIONS

This patent application incorporates by reference for any purpose the entire disclosure of U.S. patent application Ser. No. 14/954,558, filed on Nov. 30, 2015.

TECHNICAL FIELD

The present invention relates generally to heating, ventilation, and air conditioning (HVAC) systems and, more particularly, but not by way of limitation, to modulating blower speed to maximize latent capacity of an HVAC system.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

A heating, ventilation, and air conditioning (HVAC) system for regulating humidity of an enclosed space that includes an evaporator coil and a metering device fluidly coupled to the evaporator coil via a distribution line. The HVAC system further includes a variable-speed circulation fan for circulating air around the evaporator coil. A temperature sensor is thermally exposed to the distribution line. At least one controller is operatively coupled to the temperature sensor and to the variable-speed circulation fan. The at least one controller adjusts a speed of the variable-speed circulation fan to increase latent capacity of the HVAC system responsive to a determination that a temperature of fluid in the distribution line exceeds an optimal distribution line temperature.

A method that includes monitoring an evaporator coil surface temperature associated with a heating, ventilation, and air conditioning (HVAC) system and calculating, via at least one controller, an optimal evaporator coil surface temperature based on environmental conditions. The method also includes determining if the evaporator coil surface temperature exceeds the optimal evaporator coil surface temperature. Responsive to a determination that the evaporator coil surface temperature exceeds the optimal evaporator coil surface temperature, adjusting, via the at least one controller, a speed of a variable-speed circulation fan to alter the evaporator coil surface temperature. The adjusting the speed of the variable-speed circulation fan increases a latent capacity of the HVAC system.

A heating, ventilation, and air conditioning (HVAC) system for regulating humidity of an enclosed space that includes an evaporator coil and a metering device fluidly coupled to the evaporator coil via a distribution line. The HVAC system further includes a variable-speed circulation fan for circulating air around the evaporator coil. A temperature sensor is thermally exposed to the distribution line. At least one controller is operatively coupled to the temperature sensor and to the variable-speed circulation fan. A condenser coil is fluidly coupled to the metering device and a compressor is fluidly coupled to the condenser coil and the evaporator coil. A condenser fan circulates air around the condenser coil. The at least one controller adjusts a speed of the variable-speed circulation fan to increase latent capacity of the HVAC system responsive to a determination that a temperature of fluid in the distribution line exceeds an optimal distribution line temperature.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
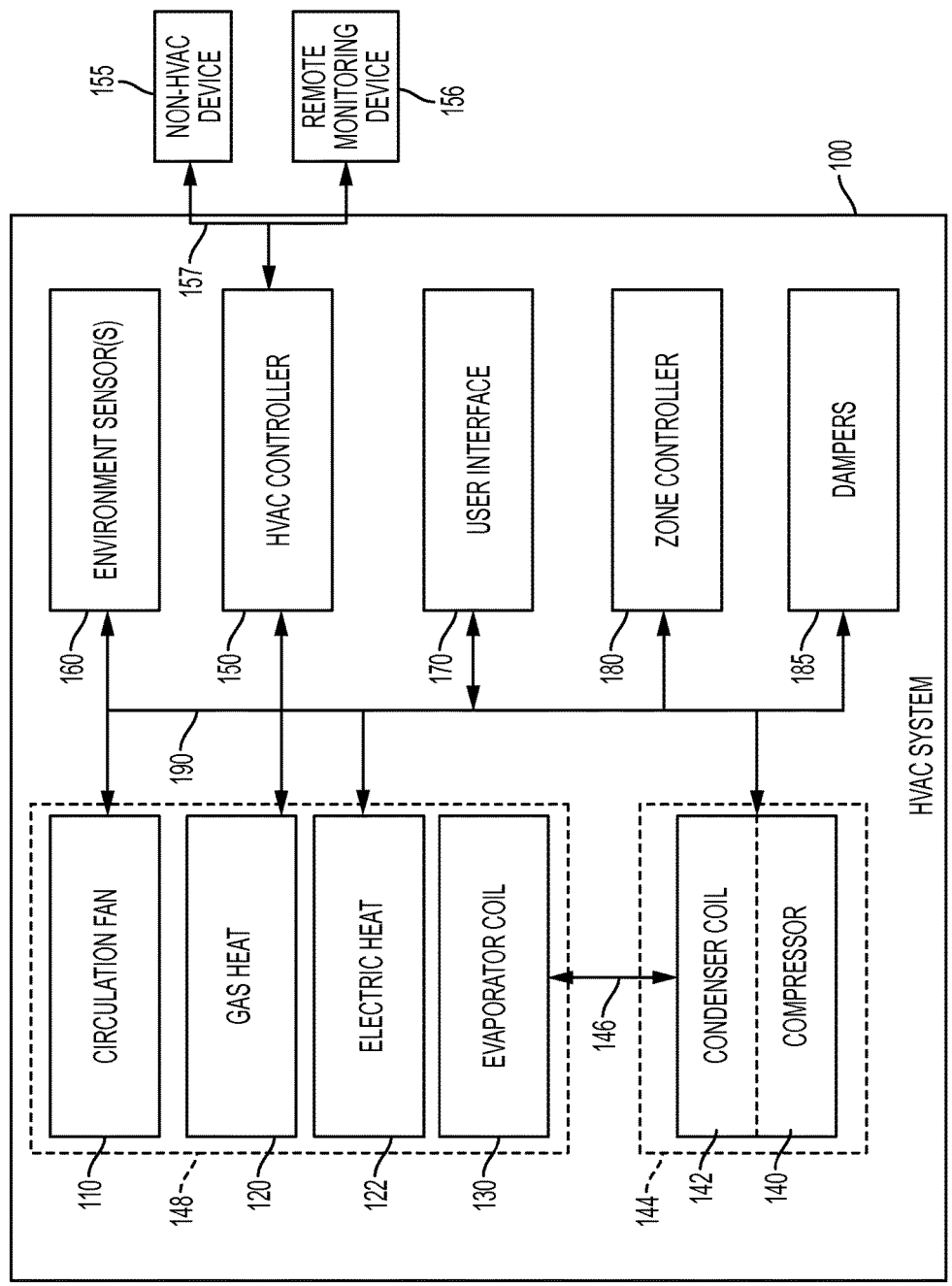
FIG. 1 is a block diagram of an exemplary HVAC system.

Various embodiments of the present invention will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort.

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs.

Another air dehumidification approach involves re-heating of air leaving an evaporator coil. This approach may also result in over-cooling of the conditioned air and results in occupant discomfort.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101 (shown in FIG. 2). In a typical embodiment, the enclosed space 101 (shown in FIG. 2) is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 110, a gas heat 120, electric heat 122 typically associated with the circulation fan 110, and a refrigerant evaporator coil 130, also typically associated with the circulation fan 110. The circulation fan 110, the gas heat 120, the electric heat 122, and the refrigerant evaporator coil 130 are collectively referred to as an "indoor unit" 148. In a typical embodiment, the indoor unit 148 is located within, or in close proximity to, the enclosed space 101 (shown in FIG. 2). The HVAC system 100 also includes a compressor 140 and an associated condenser coil 142, which are typically referred to as an "outdoor unit" 144. In various embodiments, the outdoor unit 144 is, for example, a rooftop unit or a ground-level unit. The compressor 140 and the associated condenser coil 142 are connected to an associated evaporator coil 130 by a refrigerant line 146. In a typical embodiment, the compressor 140 is, for example, a single-stage compressor, a multi-stage compressor, a single-speed compressor, or a variable-speed compressor. The circulation fan 110, sometimes referred to as a blower, is configured to operate at different capacities (i.e., variable motor speeds) to circulate air through the HVAC system 100, whereby the circulated air is conditioned and supplied to the enclosed space 101 (shown in FIG. 2).

Still referring to FIG. 1, the HVAC system 100 includes an HVAC controller 150 that is configured to control operation of the various components of the HVAC system 100 such as, for example, the circulation fan 110, the gas heat 120, the electric heat 122, and the compressor 140 to regulate the environment of the enclosed space 101 (shown in FIG. 2). In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101 (shown in FIG. 2).

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101 (shown in FIG. 2). In a typical embodiment, the HVAC controller 150 also includes a processor and a memory to direct operation of the HVAC system 100 including, for example, a speed of the circulation fan 110.

Still referring to FIG. 1, in some embodiments, the plurality of environment sensors 160 is associated with the HVAC controller 150 and also optionally associated with a user interface 170. The plurality of environment sensors 160 provide environmental information within a zone or zones of the enclosed space 101 (shown in FIG. 2) such as, for example, temperature and humidity of the enclosed space 101 (shown in FIG. 2) to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101 (shown in FIG. 2), and calculate operational parameters of the HVAC system 100 as disclosed herein.

In a typical embodiment, the HVAC system 100 is configured to communicate with a plurality of devices such as, for example, a monitoring device 156, a communication device 155, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101 (shown in FIG. 2). Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101 (shown in FIG. 2).

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

Figure 2A:
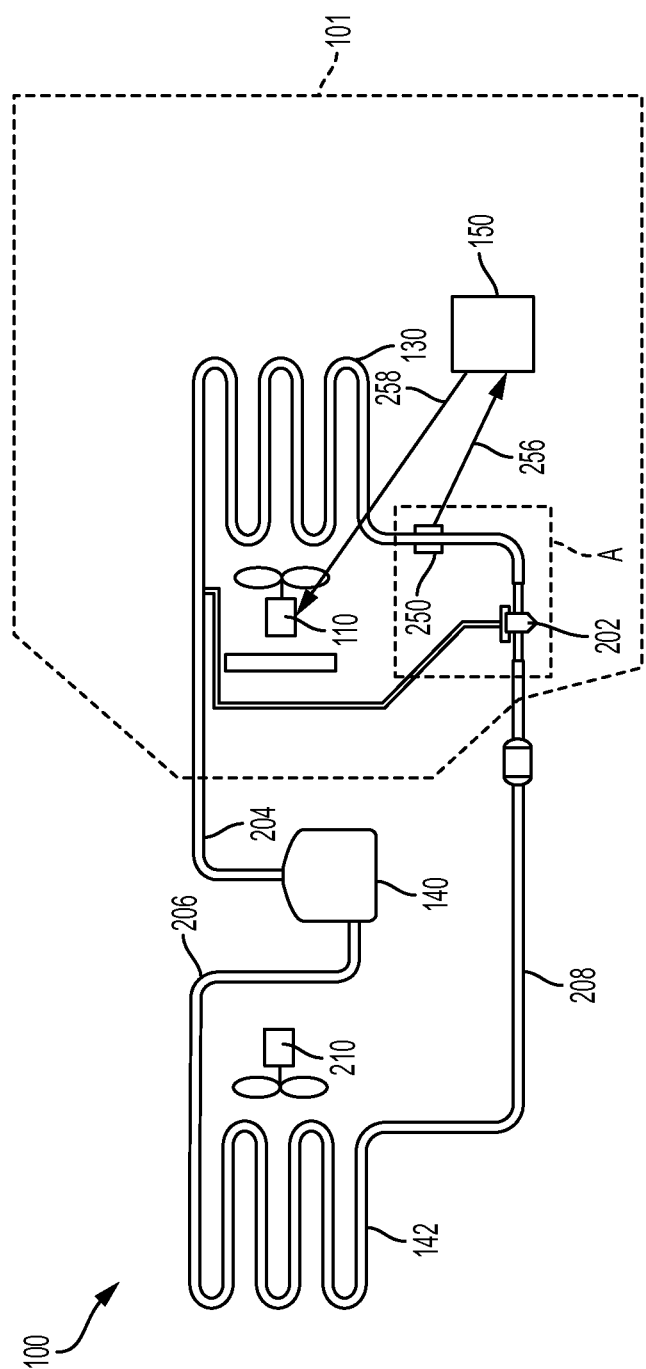
FIG. 2A is a schematic diagram of the exemplary HVAC system of FIG. 1.

FIG. 2A is a schematic diagram of the exemplary HVAC system 100. For illustrative purposes, FIG. 2A will be described herein relative to FIG. 1. The HVAC system 100 includes the evaporator coil 130, the condenser coil 142, the compressor 140, and a metering device 202. In a typical embodiment, the metering device 202 is, for example, a thermostatic expansion valve or a throttling valve. The evaporator coil 130 is fluidly coupled to the compressor 140 via a suction line 204. The compressor 140 is fluidly coupled to the condenser coil 142 via a discharge line 206. In a typical embodiment, the compressor 140 is a variable-speed compressor. The condenser coil 142 is fluidly coupled to the metering device 202 via a liquid line 208.

Still referring to FIG. 2A, during operation, low-pressure, low-temperature refrigerant is circulated through the evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the evaporator coil 130 by the circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the compressor 140 via the suction line 204. In a typical embodiment, the compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant leaves the compressor 140 via the discharge line 206 and enters the condenser coil 142.

Outside air is circulated around the condenser coil 142 by a condenser fan 210. The outside air is typically cooler than the high-pressure, high-temperature, superheated vapor refrigerant present in the condenser coil 142. Thus, heat is transferred from the high-pressure, high-temperature, super-heated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the evaporator coil 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as "flash evaporation." The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the evaporator coil 130.

Figure 2B:
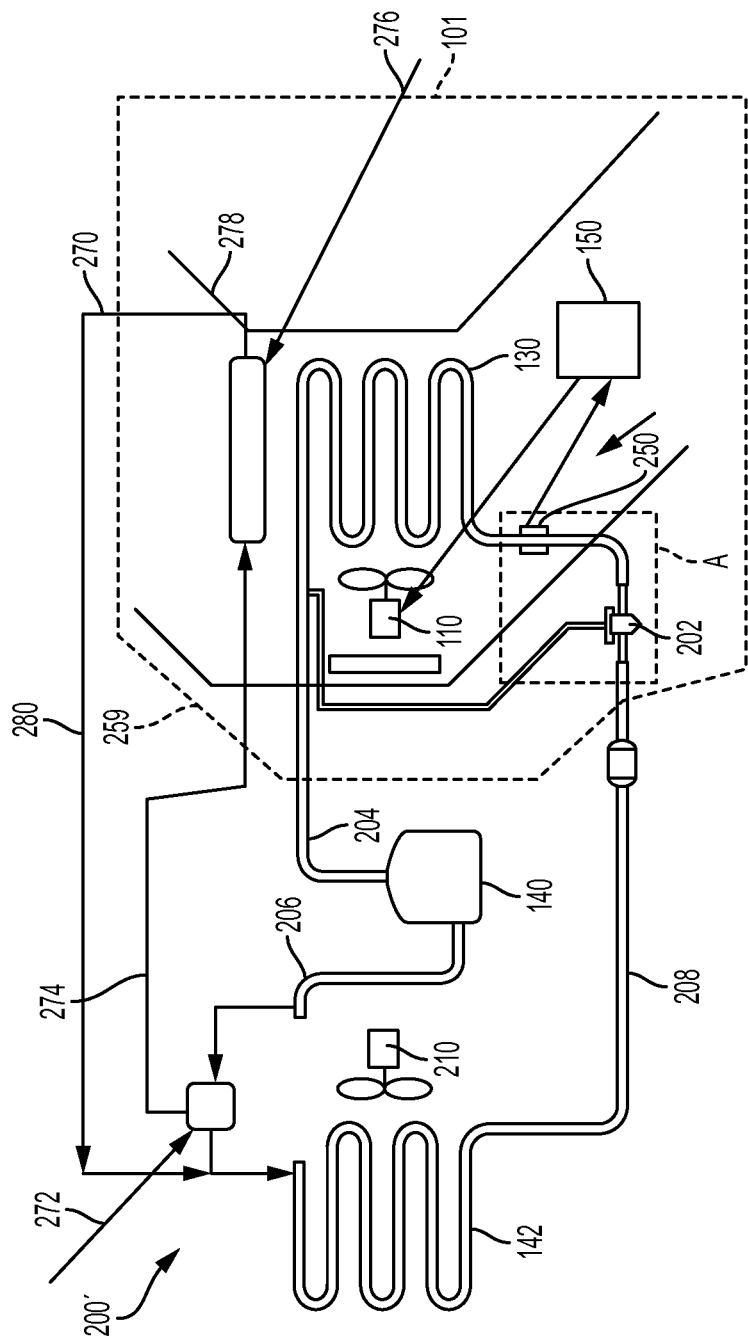
FIG. 2B is a schematic diagram of the exemplary HVAC system including a re-heat loop.

FIG. 2B is a schematic diagram of an HVAC system 200' including a re-heat loop 270. In the HVAC system 200', high-pressure, high-temperature, superheated vapor refrigerant leaves the compressor 140 via the discharge line 206. The high-pressure, high-temperature, superheated vapor refrigerant enters a three-way valve 272 where a portion of the high-pressure, high-temperature, superheated vapor refrigerant is diverted into a re-heat feed line 274. The re-heat feed line 274 directs the high-pressure, high-temperature, superheated vapor refrigerant to a re-heat coil 276. In a typical embodiment, the re-heat coil 276 is positioned in a supply duct 278 downwind from the evaporator coil 130. The re-heat coil 276 facilitates transfer of a portion of the heat stored in the high-pressure, high-temperature, superheated vapor refrigerant to air moving through the supply duct 278 thereby heating the air in the supply duct 278. Heating the air in the supply duct 278 corrects over cooling of the air in the supply duct 278 and facilitates further dehumidification of the air in the supply duct 278. After leaving the re-heat coil 276, the high-pressure, high-temperature, superheated vapor refrigerant travels through a re-heat return line 280 and enters the condenser coil 142.

Figure 2C:
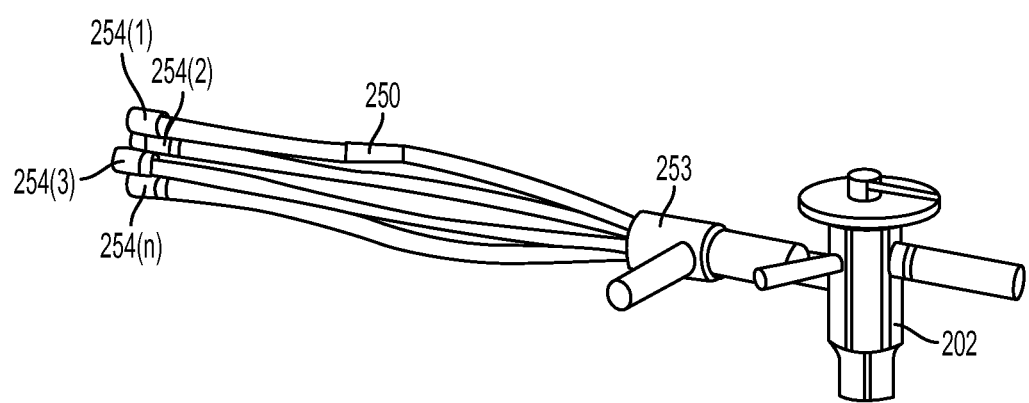
FIG. 2C is a detailed view of area A of FIG. 2A illustrating a distributor.

FIG. 2C is a detailed view of Area A of FIG. 2A. The metering device 202 is fluidly coupled to a distributor 253. The distributor 253 distributes flow of the liquid/vapor refrigerant mixture emerging from the metering device 202 into a plurality of distributor lines 254(1)-254(n). A temperature sensor 250 is thermally exposed at least one distributor line of the plurality of distributor lines 254(1)-254(n) before the at least one distributor line enters the evaporator coil 130 thereby ensuring that a temperature of the at least one distributor line is approximately equal to a temperature of the plurality of distributor lines 254(1)-254(n). In a typical embodiment, the temperature sensor 250 is, for example, a thermistor; however, in other embodiments, the temperature sensor 250 is a thermocouple, a thermometer, or other appropriate device as dictated by design requirements. In a typical embodiment, the temperature sensor 250 measures a temperature of the liquid/vapor refrigerant mixture in the selected distributor line 254(a). The distributor-line temperature is used as a proxy for saturated suction temperature.

The temperature sensor 250 communicates with the HVAC controller 150 as illustrated in FIG. 2 by arrow 256. In various embodiments, the temperature sensor 250 communicates with the HVAC controller 150 via, for example, a wired connection or a wireless connection. If the relative humidity of the enclosed space 101 reaches a maximum threshold value, as determined by at least one environment sensor of the plurality of environment sensors 160 (shown in FIG. 1), the HVAC controller 150 transmits a signal 258 to the circulation fan 110 to reduce a speed of the circulation fan 110. In various embodiments, the signal 258 is transmitted via a wired connection or wireless connection as dictated by design requirements. Reducing the speed of the circulation fan 110 lowers a temperature of the evaporator coil 130. As will be shown and discussed below, lowering a temperature of the evaporator coil 130 increases latent capacity of the HVAC system 100. In a typical embodiment, the speed of the circulation fan 110 can be lowered until the temperature of the evaporator coil 130 reaches a freezing temperature of the refrigerant present in the evaporator coil 130. Cooling the evaporator coil 130 to a temperature colder than the freezing temperature of water results in formation of frost on the evaporator coil 130 and causes damage to the HVAC system 100. The optimal temperature of the evaporator coil 130 varies with indoor dry-bulb temperature, indoor relative humidity, and outdoor temperature. Thus, the desired temperature of the evaporator coil 130 must be constantly modulated for optimal results.

Figure 3A:
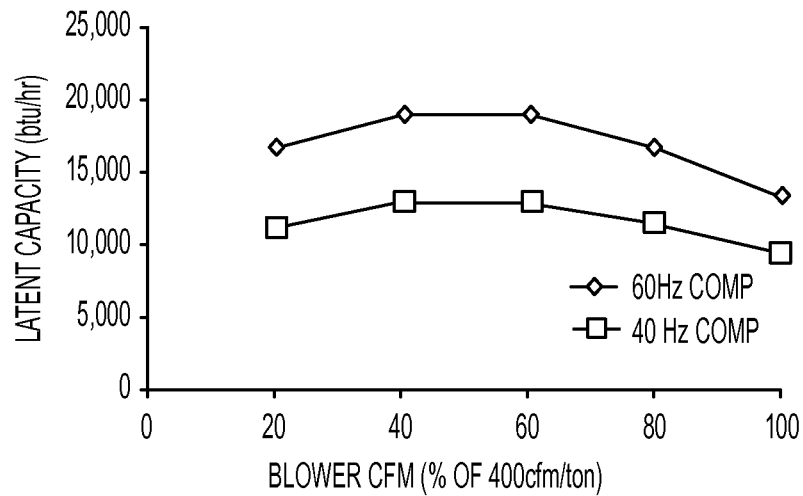
FIG. 3A is a table illustrating variance of latent capacity with circulation fan speed according to an exemplary embodiment.
Figure 3B:
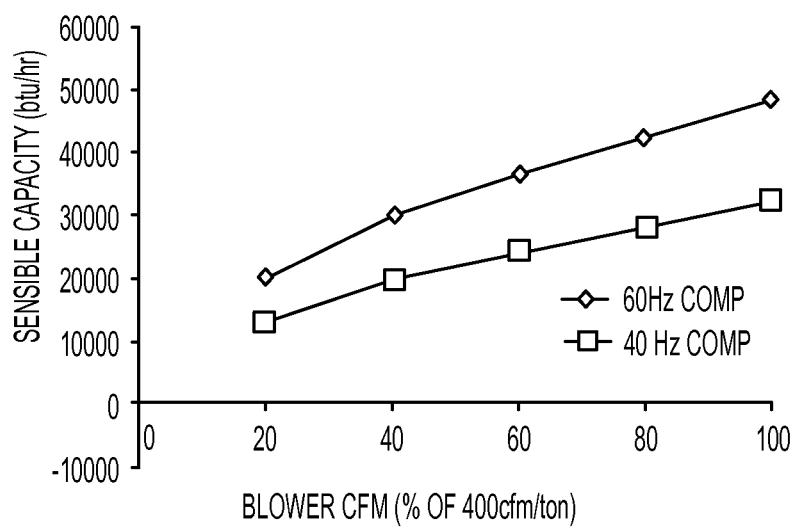
FIG. 3B is a table illustrating variance of sensible capacity with circulation fan speed according to an exemplary embodiment.

FIG. 3A is a table illustrating the variance of latent capacity with circulation-fan speed. FIG. 3B is a table illustrating the variance of sensible capacity with circulation fan speed. For illustrative purposes, FIGS. 3A-3B will be described herein relative to FIGS. 1-2. In FIG. 3A, when the compressor 140 is operating, for example, at 60 Hz and the speed of the circulation fan 110 decreases from 100% of operating speed to approximately 60% of operating speed, latent capacity increases from approximately 15,000 BTU/hr to approximately 20,000 BTU/hr. In the same scenario, as shown in FIG. 3B, the sensible capacity decreases from approximately 45,000 BTU/hr to approximately 30,000 BTU/hr. If the compressor is operating, for example, at 40 Hz and the speed of the circulation fan 110 decreases from 100% of operating speed to approximately 60% of operating speed, latent capacity increases from approximately 10,000 BTU/hr to approximately 12,000 BTU/hr. In the same scenario, as shown in FIG. 3B, the sensible capacity decreases from approximately 30,000 BTU/hr to approximately 20,000 BTU/hr. Such an increase in latent capacity is reflective of an ability of the HVAC system 100 to further dehumidify the conditioned air without changing a temperature of the conditioned air. Thus, further dehumidification can be accomplished without over-cooling an interior space.

Figure 4:
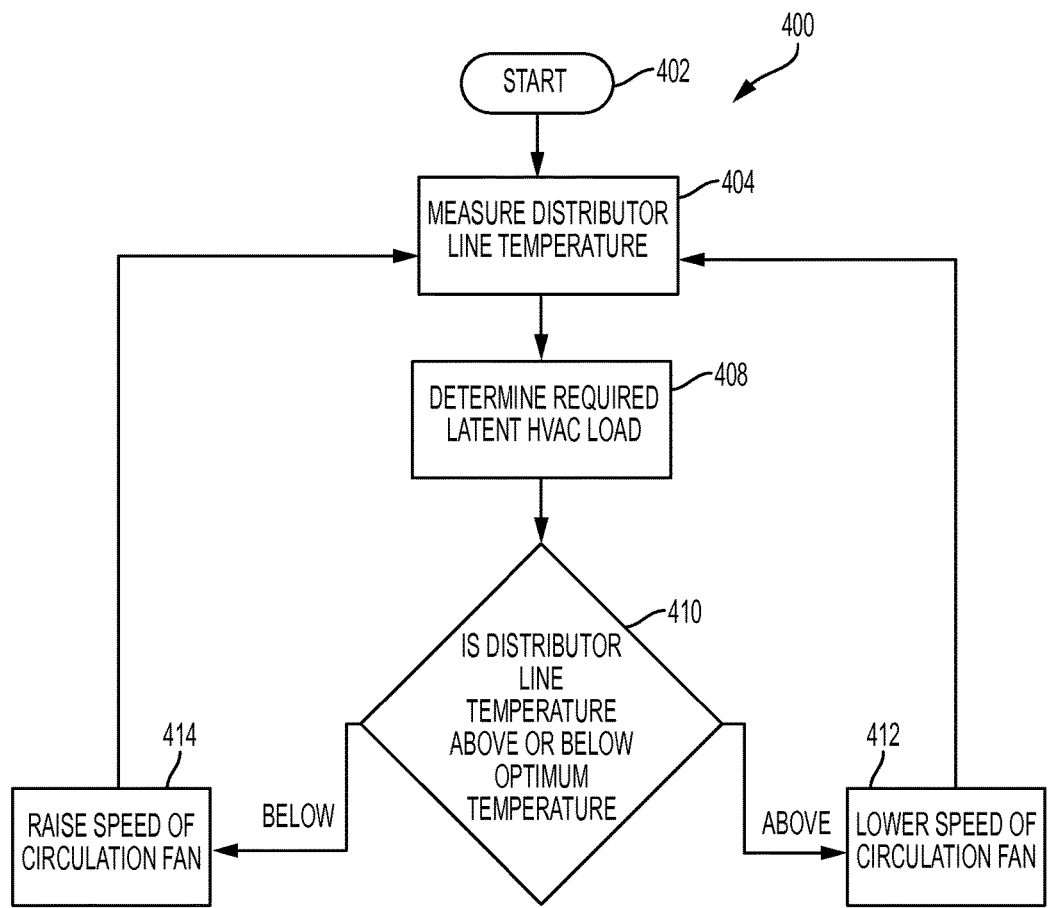
FIG. 4 is a flow chart illustrating an exemplary process for dehumidifying conditioned air.

FIG. 4 is a flow diagram illustrating an exemplary process 400 for dehumidifying conditioned air. For illustrative purposes, the process 400 will be described herein relative to FIGS. 1-3. The process 400 begins at step 402. At step 404, a distributor line temperature is measured via the temperature sensor 250 and a signal corresponding to the distributor line temperature is transmitted to the HVAC controller 150. In a typical embodiment, the temperature sensor 250 is, for example, a thermistor; however, in other embodiments, the temperature sensor 250 could be a thermocouple, a thermometer, or other appropriate device as dictated by design requirements. As discussed herein, the distributor line temperature is measured as a proxy for a surface temperature of the evaporator coil 130.

Still referring to FIG. 4, at step 408, the HVAC controller 150 determines a required latent load on the HVAC system 100 based on a relative humidity of the enclosed space 101 and a pre-determined desired relative humidity. In a typical embodiment, the relative humidity of the enclosed space 101 is determined via at least one sensor of the plurality of environment sensors 160. In a typical embodiment, the pre-determined desired relative humidity is, for example, input into the HVAC controller 150 via, for example, the user interface 170. In a typical embodiment, the pre-determined desired relative humidity is input into the HVAC controller 150 by, for example, a user or a manufacturer. At step 410, the HVAC controller 150 compares the sensed distributor line temperature to a calculated optimum evaporator coil temperature. In a typical embodiment, the optimal distributor line temperature is dependent upon environmental conditions at a given speed of the circulation fan 110 and a given speed of the compressor 140. In a typical embodiment, the optimal distributor line temperature is used a proxy for an optimal surface temperature of the evaporator coil 130.

Still referring to FIG. 4, if it is determined in step 410 that the sensed distributor line temperature is greater than the calculated optimal distributor line temperature, the process 400 proceeds to step 412. At step 412, the HVAC controller 150 transmits a signal 258 to the circulation fan 110 to reduce a speed of the circulation fan 110. In a typical embodiment, the signal 258 is transmitted via a wireless or a wired connection. Reduction of the speed of the circulation fan 110 lowers a surface temperature of the evaporator coil 130 and increases the latent capacity of the HVAC system 100 thereby allowing the HVAC system 100 to provide further dehumidification without an associated change in air temperature. If it is determined in step 410 that the sensed distributor line temperature is less than the calculated optimal distributor line temperature, the process 400 proceeds to step 414. At step 414, the HVAC controller 150 transmits a signal 258 to the circulation fan 110 to increase the speed of the circulation fan 110. In a typical embodiment, a speed of the circulation fan 110 is increased if, for example, the evaporator coil 130 begins freezing. The optimal distributor line temperature varies with indoor dry-bulb temperature, indoor relative humidity, and outdoor temperature. Thus, the desired distributor line temperature must be constantly modulated for optimal results. The process 400 returns to step 404.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A heating, ventilation, and air conditioning (HVAC) system for regulating humidity of an enclosed space, the system comprising:
   an evaporator coil;
   a metering device fluidly coupled to the evaporator coil via a distribution line;
   a variable-speed circulation fan for circulating air around the evaporator coil;
   a temperature sensor thermally exposed to the distribution line;
   at least one controller operatively coupled to the temperature sensor and to the variable-speed circulation fan;
   wherein the at least one controller is configured to:
      determine a latent cooling load based on a relative-humidity setpoint;
      determine an optimal distributor line temperature that corresponds to the latent cooling load;
      compare a measured distributor line temperature to the optimal distributor line temperature;
      responsive to a determination that the measured distributor line temperature exceeds the optimal distributor line temperature, reduce a speed of the variable-speed circulation fan; and
      responsive to a determination that the measured distributor line temperature falls below the optimal distributor line temperature, increase the speed of the variable-speed circulation fan.

2. The system of claim 1, comprising:
   a condenser coil fluidly coupled to the metering device;
   a compressor fluidly coupled to the condenser coil and the evaporator coil; and
   a condenser fan for circulating air around the condenser coil.

3. The system of claim 1, wherein the at least one controller is configured to detect a relative humidity of the enclosed space.

4. The system of claim 3, wherein the at least one controller is configured to calculate the optimal distribution line temperature based on the relative humidity of the enclosed space.

5. The system of claim 4, wherein the at least one controller is configured to modulate the speed of the variable-speed circulation fan to maintain the optimal distribution line temperature.

6. The system of claim 4, wherein the optimal distribution line temperature is calculated based on at least one of indoor dry-bulb temperature, relative humidity, and outdoor temperature.

7. The system of claim 1, wherein the temperature sensor is configured to measure the distribution line temperature as a proxy for an evaporator coil surface temperature.

8. The system of claim 1, wherein the HVAC system comprises a rooftop unit.

9. The system of claim 1, wherein the at least one controller is configured to communicate with at least one of a monitoring device and a communication device.

10. The system of claim 1, wherein the at least one controller is configured to reduce the speed of the variable-speed circulation fan thereby lowering a temperature of the evaporator coil.

11. The system of claim 1, wherein the temperature sensor comprises a thermistor.

12. A method of regulating humidity of an enclosed space, the method comprising:
   measuring a distributor-line temperature associated with a heating, ventilation, and air conditioning (HVAC) system;
   determining, via at least one controller, a latent cooling load based at least in part on environmental conditions;
   calculating, via the at least one controller, an optimal distributor-line temperature corresponding to the latent cooling load;
   comparing the measured distributor-line temperature to the optimal distributor-line temperature;
   determining if the measured distributor-line temperature exceeds the optimal distributor-line temperature;
   responsive to a determination that the distributor-line temperature exceeds the optimal distributor-line temperature, adjusting, via the at least one controller, a speed of a variable-speed circulation fan to lower an evaporator coil surface temperature; and
   wherein the adjusting the speed of the variable-speed circulation fan increases a latent capacity of the HVAC system.

13. The method of claim 12, wherein the step of measuring comprises measuring a saturated suction temperature of the HVAC system.

14. The method of claim 12, wherein increasing the latent capacity of the HVAC system facilitates dehumidification of conditioned air without an associated change of temperature of the conditioned air.

15. The method of claim 12, comprising detecting, via the at least one controller, a relative humidity of an enclosed space.

16. The method of claim 15, wherein the at least one controller is configured to modulate the speed of the variable-speed circulation fan to maintain the optimal distributor-line temperature.

17. The method of claim 12, wherein the adjusting comprises decreasing a speed of the variable-speed circulation fan.

18. The method of claim 12, comprising, responsive to a determination that the distributor-line temperature does not exceed the optimal distributor-line temperature, maintaining, via the at least one controller, a speed of a variable-speed circulation fan.

19. A heating, ventilation, and air conditioning (HVAC) system for regulating humidity of an enclosed space, the system comprising:
- an evaporator coil;
- a metering device fluidly coupled to the evaporator coil via a distribution line;
- a variable-speed circulation fan for circulating air around the evaporator coil;
- a temperature sensor thermally exposed to the distribution line;
- at least one controller operatively coupled to the temperature sensor and to the variable-speed circulation fan;
- a condenser coil fluidly coupled to the metering device;
- a compressor fluidly coupled to the condenser coil and the evaporator coil;
- a condenser fan for circulating air around the condenser coil;
- wherein the at least one controller is configured to:
  - determine a latent cooling load based on a relative-humidity setpoint;
  - determine an optimal distributor line temperature that corresponds to the latent cooling load;
  - compare a measured distributor line temperature to the optimal distributor line temperature;
  - responsive to a determination that the measured distributor line temperature exceeds the optimal distributor line temperature, reduce a speed of the variable-speed circulation fan; and
  - responsive to a determination that the measured distributor line temperature falls below the optimal distributor line temperature, increase the speed of the variable-speed circulation fan.

* * * * *